United States Patent [19]

Baus et al.

[11] 4,424,845

[45] Jan. 10, 1984

[54] PNEUMATIC TIRE TREAD

[75] Inventors: Andre E. J. Baus, Bettembourg; Jean F. L. Fontaine, Bürden, both of Luxembourg; Maurice Graas, Schockville, Belgium

[73] Assignee: The Goodyear Tire & Rubber Company, Akron, Ohio

[21] Appl. No.: 358,945

[22] Filed: Mar. 17, 1982

[51] Int. Cl.³ ............................................. B60C 11/00
[52] U.S. Cl. .............................. 152/209 R; D12/139; D12/144
[58] Field of Search .......... 152/209 R, 209 D, 209 A; D12/136, 139, 144, 142, 143

[56] References Cited

U.S. PATENT DOCUMENTS

| D. 55,302 | 5/1920 | Novak | D12/139 |
|---|---|---|---|
| D. 236,710 | 9/1975 | Buck et al. | D12/144 |
| 4,166,490 | 9/1979 | Poque | 152/209 R |

FOREIGN PATENT DOCUMENTS 1000844 9/1981 United Kingdom .

*Primary Examiner*—Michael W. Ball
*Attorney, Agent, or Firm*—Frank Pincelli

[57] ABSTRACT

A pneumatic radial passenger tire having a ground-engaging portion, said tread portion being provided with a pair of substantially sinuous parallel grooves disposed in the central portion of the tire, one on each side of the mid-circumferential centerplane. Disposed axially outward of each of said grooves is an intermediate generally sinuous groove which extends about the circumference of said tire and is disposed such that alternate axially inner peaks coincide with the axially outer peaks of said central groove. An axially extending groove is provided at each of said axially outer peaks of each intermediate groove which extend out to the tread edge of said tire.

9 Claims, 3 Drawing Figures

PNEUMATIC TIRE TREAD

The foregoing abstract is not to be taken as limiting the invention of this application, and in order to understand the full nature and extent of the technical disclosure of this application, reference must be made to the accompanied drawings and the following detailed description.

BACKGROUND OF THE INVENTION

The present invention relates to pneumatic tires and more particularly to a novel tread configuration for tires of the radial type construction.

The tread portion of a tire is generally defined by a plurality of grooves or depressions which form ground-engaging relief elements. The particular configuration of these relief elements has a significant effect upon the dry traction, wet traction, snow traction, noise level and rolling resistance of the tire. Generally, any particular tread pattern selected for any tire involves a compromise between these performance characteristics. The particular performance characteristics of the tire and the compromises between these performance characteristics is generally not known until the tire is actually made and tested.

Applicants have discovered a new tread configuration which permits the use of low rolling resistant compounds in the tread portion of the tire while maintaining acceptable levels of performance in dry traction, wet traction, snow traction and noise level.

DETAILED DESCRIPTION OF THE DRAWINGS

Figure 1:
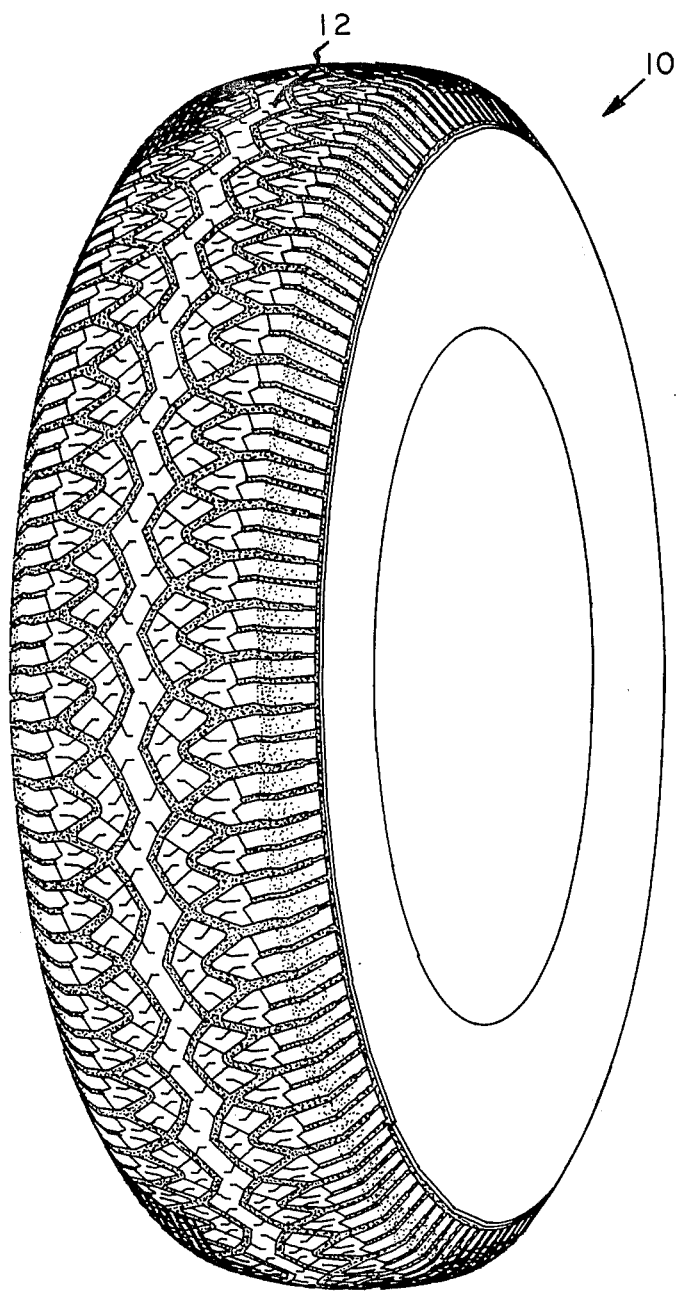
FIG. 1 is a perspective view of a tire made in accordance with the present invention.
Figure 2:
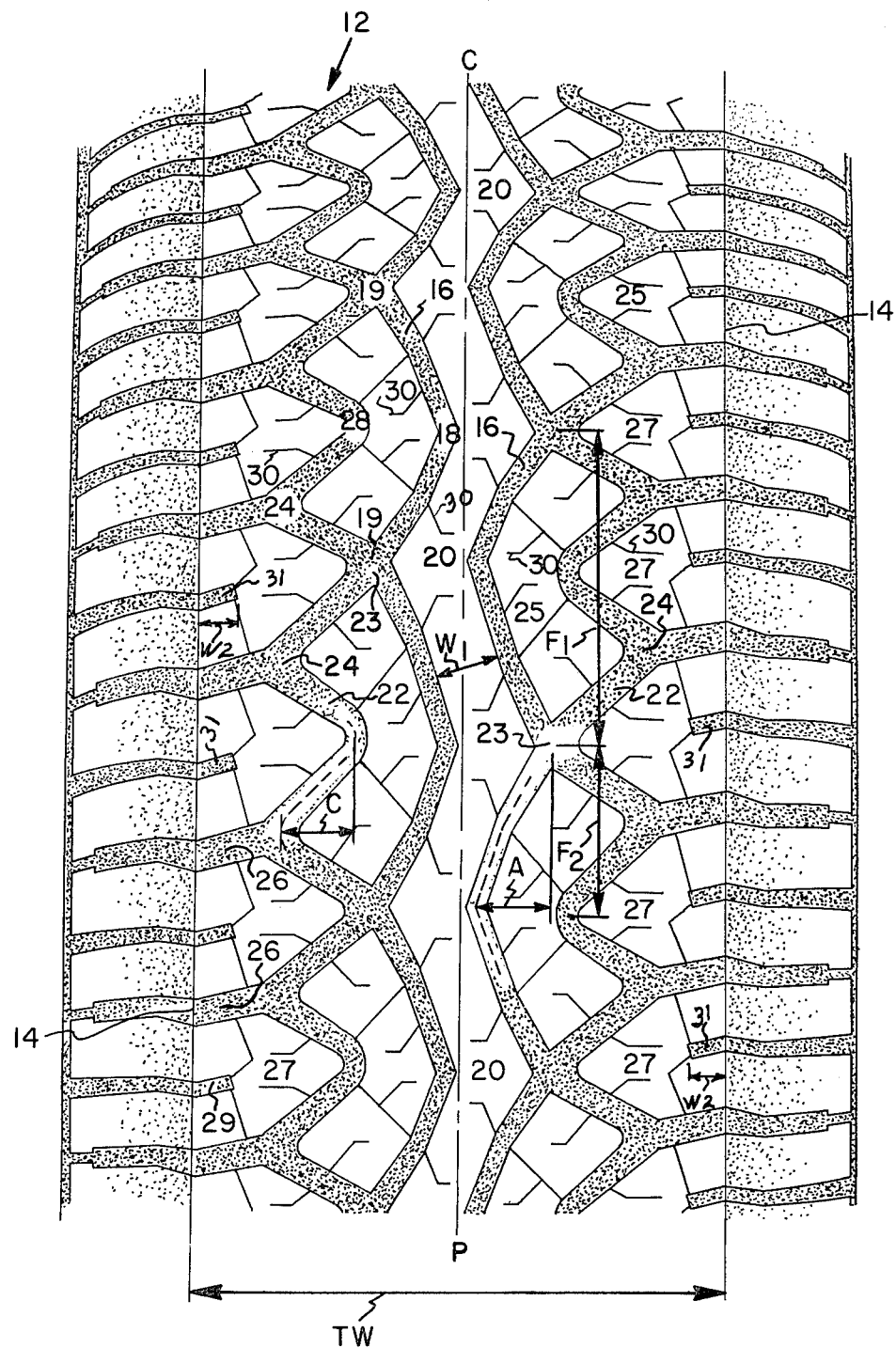
FIG. 2 is an enlarged front plan view of the tread portion of the tire of FIG. 1 made in accordance with the present invention.

Referring to FIGS. 1 and 2, there is illustrated a pneumatic tire 10 having a tread portion 12 made in accordance with the present invention. The tire 10 is of the radial type construction for use on passenger vehicles. For the purposes of this invention a radial type construction shall be considered a tire having a carcass reinforcing ply structure which extends from bead to bead, the cords of the reinforcing ply structure being oriented at an angle in the range of 75° to 90° with respect to the mid-circumferential centerplane CP of the tire.

The tread portion 12 is provided with a pair of axially opposed tread edges 14 which define the axially outer boundaries of the tread portion 12 which comes in contact with the ground-engaging surface upon which the tire is to be operated. A pair of generally zig-zag or sinuous grooves 16 which extend about the circumference of the tire are provided in the central portion of the tread portion 12, one on each side of the mid-circumferential centerplane CP of the tire. The grooves 16 are preferably spaced equidistant from the mid-circumferential centerplane of the tire and form a generally zig-zag or sinuous central rib 20 which extends about the circumference of the tire 10. Each central zig-zag groove 16 comprises a plurality of alternating axially inner peaks 18 and axially outer peaks 19 with respect to the mid-circumferential centerplane CP of the tire. Each groove 16 has an amplitude A, as measured from the center line of the groove, in the range of 5% to 15% of the tread width TW, preferably, as illustrated, of about 10%. For the purposes of this invention, the tread width TW is the maximum axial distance perpendicular to the mid-circumferential centerplane CP of the tire between tread edges 14 as measured from the footprint of the tire inflated to design inflation pressure and at rated load. The cross-sectional width W1 of rib 20 may range from about 5% to 15% of the tread width TW. Preferably, the cross-sectional width W1 is approximately 10%. The cross-sectional width W1 is measured perpendicular to the overall direction of the rib 20. Rib 20 and grooves 16 each have a repeating longitudinal frequency F1 which ranges from about 40% to 60% of the tread width TW, preferably of about 50%. For the purposes of this invention, the repeating longitudinal frequency F1 is the circumferential distance in which the zig-zag path or rib 20 or grooves 16 goes through one complete cycle as is illustrated in FIG. 2.

Disposed axially outward of each zig-zag groove 16 with respect to the mid-circumferential centerplane CP of the tire 10 is an intermediate generally zig-zag or sinuous groove 22 having a plurality of axially inner peaks 23 which circumferentially alternate with axially outer peaks 24. Intermediate zig-zag groove 22 has a repeating longitudinal frequency F2 which is equal to approximately twice that of the central zig-zag groove 16, that is, for every single repeating frequency F1 of central zig-zag groove 16, zig-zag groove 22 has two repeating zig-zag cycles. Intermediate zig-zag grooves 22 are each disposed such that every other circumferentially adjacent inner peak 23 coincides with circumferentially adjacent axially outer peak 19 of zig-zag grooves 16. The amplitude C of each intermediate groove, as measured from the center line of the groove, may range from about 10% to 25% of the tread width, preferably of about 15%.

The tread portion 12 is further provided with a plurality of substantially axially extending grooves 26 which extend from each axially outer peak 24 of each intermediate groove 16 to the closest respective tread edge 14. Preferably, each groove 26 comprises a single straight groove which lies at an angle of no less than about 75° with respect to the mid-circumferential centerplane CP. Preferably, as illustrated in the embodiment shown, the grooves 26 lie at an angle of approximately 85° with respect to the midcircumferential centerplane CP.

The grooves 16, 22 and 26 each have a width such that when in the footprint of the tire the grooves do not close up at the surface of the tread portion 12.

Grooves 16 and intermediate grooves 22 combine to form a plurality of relief elements 25 spaced about the circumference of the tire 10 such that a single relief element 25 is disposed between circumferentially adjacent axially outer peaks 19 of grooves 16. Each intermediate relief element 25 has a generally outer configuration substantially that of a crescent shape with the convex side facing the rib 20 and the concave side facing the closest respective tread edge 14. The concave side of each intermediate relief element 25 has a generally V or U shape configuration.

Intermediate zig-zag grooves 22 and axially extending grooves 26 combine to form a plurality of shoulder relief elements 27 which extend from the concave side of each intermediate relief element axially outward towards the closest respective tread edge 14. The axially inner end 28 of each shoulder relief element 27 having a generally V or U shape configuration. Each shoulder element 27 is preferably provided with at least one narrow groove 31 which extends from the tread edge axially inward terminating within the element, preferably not extending more than 50% of the axial width W2 of the element 27.

Rib 20, intermediate relief element 25 and shoulder relief element 27 are each provided with at least one narrow cut or blade 30 which extends from the periphery of the element axially inward terminating within the element. Each blade 30 comprises a first segment oriented at an angle of approximately 45° with respect to the mid-circumferential centerplane of the tire and a second segment oriented at an angle of approximately 90° to the mid-circumferential centerplane of the tire. However, these blades may be entirely omitted if desired. For the purposes of this invention, a blade shall be considered a narrow groove which when in the footprint of the tire closes up at the tread surface.

Figure 3:
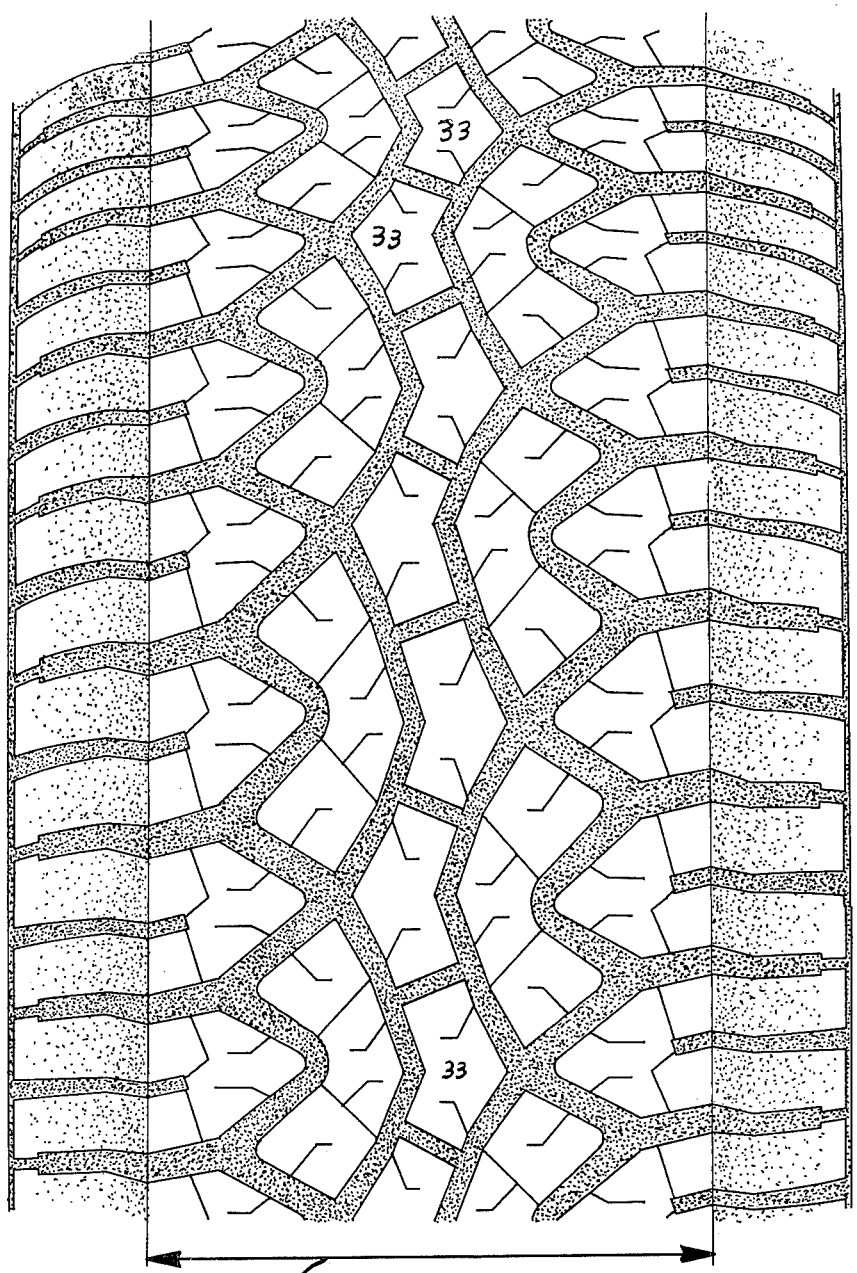
FIG. 3 is an enlarged fragmentary front plan view of a modified tread pattern made in accordance with the present invention.

While it is preferred to have a circumferentially extending rib in the central portion of the tire, the present invention is not so limited. If desired, the central portion of the tire between grooves 16 may be provided with a plurality of independent projections. Referring to FIG. 3, there is illustrated a modified form of the present invention wherein the central portion of the tire is provided with a plurality of independent elements 33.

While various forms of the present invention have been illustrated and described, it is clear to those skilled in the art that various changes and modifications can be made without departing from the spirit or scope of the present invention. For example, and not limited to, the repeating design cycle may be varied about the circumference of the tire (also generally known as pitching of the tread pattern).

We claim:

1. A pneumatic radial passenger tire having a ground-engaging tread portion having a pair of axially opposed tread edges, said tread portion comprising a pair of substantially sinuous parallel central grooves being disposed in the central portion of the tire such that one of said grooves is disposed on each side of the mid-circumferential centerplane of said tire, each of said grooves having a plurality of axially inner peaks which alternate with axially outer peaks with respect to the mid-circumferential centerplane of said tire, said pair of central grooves are spaced an axial distance apart so as to provide a centrally located rib which extends about the circumference of said tire, said rib having a cross-sectional width in the range of 5% to 15% of the width of said tread, each of said central grooves having an amplitude in the range of 5% to 15% of the width of said tread portion and a longitudinal repeating frequency in the range of 40% to 60% of the width of said tread, disposed axially outward of each of said grooves is an intermediate generally sinuous groove which extends about the circumference of said tire, each of said intermediate grooves having a plurality of axially inner peaks which alternate with axially outer peaks, each of said intermediate grooves having a longitudinal repeating frequency such that every other axially inner peaks of said intermediate groove coincides with circumferentially adjacent axially outer peaks of said grooves in the central portion of said tire to define spaced intermediate projections, said intermediate groove having an amplitude in the range of 10% to 25% of the width of said tread, extending from each of said axially outer peaks of each of said intermediate grooves is a substantially axially extending groove which extends outward to the closest respective tread edge.

2. A pneumatic radial passenger tire according to claim 1 further characterized in that said amplitude of said central grooves is approximately 10%.

3. A pneumatic radial passenger tire according to claim 1 further characterized in that the repeating frequency of said central groove is approximately 50% of the width of said tread.

4. A pneumatic radial passenger tire according to claim 1 further characterized in that said central grooves follow a substantially zig-zag path.

5. A pneumatic radial passenger tire having a ground-engaging tread portion said tread portion having a pair of axially opposed tread edges, a generally sinuous rib is located substantially in the central portion of said tread which extends about the circumference of said tire, disposed on each side of said rib is a continuous circumferentially extending central groove, said rib having a longitudinal frequency in the range of 40% to 60% of the width of said tread, and a cross-sectional width in the range of 5% to 15% of the width of said tread portion, each of said central grooves having a plurality of axially inner peaks which alternate with a plurality of axially outer peaks with respect to the mid-circumferential centerplane of said tire, a plurality of circumferentially spaced intermediate projections are disposed about the circumference of the tire, one being disposed between the circumferential adjacent axially outer peaks of said central grooves, each of said intermediate projections having a substantially crescent shape outer configuration having a convex side and a concave side, said convex side facing said rib and said concave side facing the closest respective tread edge, disposed axially outward adjacent each of said concave sides is a plurality of independent shoulder projections which extend axially outward towards the tread edge, each of said shoulder projections being circumferentially spaced from the next circumferential projection by a substantially axially extending groove.

6. A pneumatic radial passenger tire according to claim 5 further characterized in that the cross sectional width of said rib is approximately 10% of the width of said tread.

7. A pneumatic radial passenger tire according to claim 5 further characterized in that said rib, crescent shaped element and shoulder intermediate projections are each provided with at least one narrow blade which extends from the periphery of said element terminating within said element, each of said blades comprising a first oblique segment extending from the periphery at an angle of approximately 45° with respect to the mid-circumferential centerplane of said tire and a second segment which extends substantially perpendicular to the mid-circumferential centerplane of said tire.

8. A pneumatic radial passenger tire according to claim 5 further characterized in that said rib having a substantially zig-zag configuration.

9. A pneumatic radial passenger tire according to claim 5 further characterized in that said shoulder portion is further provided with a substantially axially extending groove which extends from the tread edge axially inward terminating said shoulder projection.

* * * * *